(12) United States Patent
Itomi

(10) Patent No.: US 8,368,389 B2
(45) Date of Patent: Feb. 5, 2013

(54) SENSOR UNIT

(75) Inventor: Shoji Itomi, Kuwana (JP)

(73) Assignee: NTN Corporation, Osaka (JP)

( * ) Notice: Subject to any disclaimer, the term of this patent is extended or adjusted under 35 U.S.C. 154(b) by 420 days.

(21) Appl. No.: 12/676,375

(22) PCT Filed: Sep. 4, 2008

(86) PCT No.: PCT/JP2008/065957
§ 371 (c)(1),
(2), (4) Date: Mar. 4, 2010

(87) PCT Pub. No.: WO2009/031607
PCT Pub. Date: Mar. 12, 2009

(65) Prior Publication Data
US 2010/0182762 A1   Jul. 22, 2010

(30) Foreign Application Priority Data

Sep. 6, 2007  (JP) ................................. 2007-231873
Sep. 6, 2007  (JP) ................................. 2007-231897

(51) Int. Cl.
*G01B 7/00* (2006.01)
*G01R 33/025* (2006.01)
(52) U.S. Cl. ............... 324/207.12; 324/202; 324/207.25
(58) Field of Classification Search .............. 324/207.12
See application file for complete search history.

(56) References Cited

U.S. PATENT DOCUMENTS

| | | | | |
|---|---|---|---|---|
| 4,716,366 A * | 12/1987 | Hosoe et al. | ............. | 324/207.12 |
| 6,070,462 A * | 6/2000 | Igarashi et al. | ............. | 73/204.22 |
| 6,198,272 B1 * | 3/2001 | Pool et al. | ..................... | 324/133 |
| 6,265,866 B1 * | 7/2001 | Ludwig et al. | ............. | 324/207.2 |
| 7,336,068 B2 * | 2/2008 | Muller | .......................... | 324/202 |
| 2003/0155912 A1 * | 8/2003 | Motz | ............................. | 324/225 |
| 2008/0040055 A1 * | 2/2008 | Dorsey et al. | ................... | 702/60 |

FOREIGN PATENT DOCUMENTS

| | | |
|---|---|---|
| JP | 3-276016 | 12/1991 |
| JP | 8-129020 | 5/1996 |
| JP | 10-038608 | 2/1998 |
| JP | 11-344302 | 12/1999 |
| JP | 2004-191101 | 7/2004 |
| JP | 2006-292491 | 10/2006 |

OTHER PUBLICATIONS

International Search Report issued Nov. 4, 2008 in International (PCT) Application No. PCT/JP2008/065957.

* cited by examiner

*Primary Examiner* — Reena Aurora
*Assistant Examiner* — Demetrius Pretlow
(74) *Attorney, Agent, or Firm* — Wenderoth, Lind & Ponack, LLP.

(57) ABSTRACT

In a sensor of a sensor unit in which working voltage or calibration voltage is supplied through a single input end, working voltage can be stably supplied to the sensor after initial calibration. The sensor unit includes a voltage stabilizing circuit for stabilizing a voltage value of a supply power source to said working voltage, and a wiring for supplying said calibration voltage to the sensor, which are provided parallel to each other between the input end of the sensor and a power source connecting end for the sensor on the circuit board, and a switching portion which can disconnect the wiring, wherein an access hole is formed in the housing through which the switching portion is accessible to disconnect the wiring.

16 Claims, 5 Drawing Sheets

SENSOR UNIT

TECHNICAL FIELD

This invention relates to a sensor for correcting detection signals using initial calibration parameters with working voltage supplied thereto, and a sensor unit including a housing for fixing in position a circuit board on which this sensor is mounted.

BACKGROUND ART

With this type of sensor unit, by fixing the circuit board on which the sensor is mounted to the housing, the sensor unit can be integrally handled. Assembling errors are unavoidable between the sensor, circuit board and housing. Therefore, many sensors are configured to correct detection signals using initial calibration parameters for correcting measurement errors resulting from assembling errors. The initial calibration parameters are unidentifiable unless measurement is carried out by completing the measuring system. Thus, initial calibration is carried out in which the detection signals of the sensor are transmitted to an external calibration device, and initial calibration parameters calculated in the external calibration device are written in a non-volatile semiconductor memory of the sensor (see e.g. JP patent publication 2004-191101A).

In order to reduce input lines to the sensor, one known sensor of this type is configured to write the initial calibration parameters with a calibration voltage that is higher than the working voltage being supplied to a single input end of the sensor, and then correct the detection signals using initial calibration parameters stored in a non-volatile memory, with working voltage supplied to the single input end of the sensor.

But in the above arrangement, in which the working voltage or calibration voltage is supplied through the single input end of the sensor, it is impossible to mount a voltage stabilizing the voltage value of the supply power source to the working voltage between the input end of the sensor and a power source connecting end for the sensor on the circuit board. This is because it is impossible to supply the calibration voltage to the input end of the sensor. But if the voltage stabilizing circuit is not mounted, it becomes difficult to use the sensor unit if the power source voltage is unstable according to the use environment, such as if a power source voltage is supplied from a generator attached to the driving source of e.g. a construction machine or an industrial machine, or if the voltage value of the supply voltage cannot be identified as a single value.

SUMMARY OF THE INVENTION

An object of this invention is to make it possible to stably supply working voltage to the sensor after initial calibration, while using, as the sensor of the sensor unit, the type in which working voltage or calibration voltage is supplied through a single input end.

In order to achieve this object, the present invention uses a sensor unit comprising a sensor for correcting detection signals using initial calibration parameters with a working voltage supplied thereto, and a housing fixing in position a circuit board on which the sensor is mounted, the sensor being configured to write the initial calibration parameters with a calibration voltage that is higher than the working voltage supplied to an input end of the sensor.

That is, as described in BACKGROUND ART, the object of the invention is to reduce the number of input lines in a sensor unit of the type in which working voltage or calibration voltage is supplied through a single input end.

The initial calibration parameters are parameters of transfer functions which make it possible for the sensor to correct by processing measurement errors resulting from assembling errors produced at least between the sensor, circuit board and housing.

The initial calibration parameters may be parameters for correcting errors resulting from variations in sensitivity of the sensor. Variations in sensitivity of the sensor may be measured beforehand with a tester before the sensor is mounted to the housing, thereby eliminating any sensor that is not up to the standards. But it is more convenient to make corrections comprehensively based on the initial calibration parameters.

The working voltage is only required to be of a voltage value that makes it possible to produce detection signals after the correction by the sensor, and does not have to be of a single voltage value.

The calibration voltage is only required to be of a voltage value that is higher than the working voltage and makes it possible for the sensor to write the parameters, and does not have to be of a single voltage value.

This invention is characterized, in the sensor unit described above, in that the sensor unit further comprises a voltage stabilizing circuit for stabilizing a voltage value of a supply power source to the working voltage, and a wiring for supplying the calibration voltage to the sensor, the voltage stabilizing circuit and the wiring being provided parallel to each other between the input end of the sensor and a power source connecting end for the sensor on the circuit board, and a switching portion which can disconnect the wiring, wherein an access hole is formed in the housing through which the switching portion is accessible to disconnect the wiring.

With this arrangement of the present invention, even though the voltage stabilizing circuit is mounted between the input end of the sensor and the power source connecting end for the sensor on the circuit board, a calibration voltage can be supplied to the input end of the sensor through the parallel-connected wiring.

After writing the initial calibration parameters, by reaching the switching portion through the access hole and disconnecting the wiring, it is possible to stably supply the working voltage to the input end of the sensor through the voltage stabilizing circuit.

Needless to say, in order to prevent the initial calibration parameters from becoming invalid, the wiring can be disconnected by operating the switching portion. This is because if, for example, the sensor and the circuit board move relative to the housing, the assembling errors fluctuate, thereby making it impossible to make corrections based on the initial calibration parameters.

For the specific structures of the wiring and the switching portion, the wiring may comprise a lead wire and the switching portion may comprise a redundant portion of the wiring.

With this arrangement, the wiring can be disconnected simply by reaching the redundant portion of the wiring, which comprises the lead wire, through the access hole and cutting it. Thus, it is possible to form the wiring and the switching portion with the single lead wire.

Alternatively, the switching portion may comprise a switch for opening and closing the wiring.

With this arrangement, the wiring can be disconnected by reaching the switch through the access hole and operating it. By reconnecting the wiring by operating the switch, parameters for corrections which have changed over time can be recalculated and written in the sensor.

In order to protect the sensor, the circuit board, etc., the access hole is preferably closed by a fixing member after disconnecting the wiring.

If the switching portion comprises the lead wire or the switch, by keeping the switching portion in a disconnected position with the fixing member, the wiring can be reliably kept disconnected using the fixing member.

The fixing member is an insulating and waterproof member which can protect live parts of e.g. the sensor, and may be a cover member or a packing material made of resin.

If the fixing member is an insulating and waterproof packing material, it is not necessary to prepare a fixing member formed by molding such as a lid. The packing material is thus less expensive.

If the packing material is made of silicon resin or urethane resin, since such packing material is sufficiently flexible, it is less likely to separate from the housing under vibrations applied to the housing.

If higher mechanical strength is required for the fixing member 9, the packing material should be an epoxy resin.

The packing material should be made of at least one of silicon resin, urethane resin and epoxy resin.

Preferably, the sensor is mounted on one side of the circuit board, with the access hole facing the other side of the circuit board, and the switching portion located in the access hole, and the housing has a board support surface supporting the other side of the circuit board around the access hole. With this arrangement, the fixing member comprising the packing material can be fastened to the access hole using the other side of the circuit board. This makes it possible to easily fit the packing member.

The physical quantity measured by the sensor is not particularly limited, provided such physical quantity requires relative positioning between the sensor elements of the sensor and the object to be measured that produces change in output in the sensor elements. For example, the sensor according to the present invention may be a sensor for converting kinetic momentum of the object to be measured to electrical signals, such as a displacement sensor, and particularly non-contact type sensor that needs positioning, such as rotary encoders, potentiometers, tachogenerators, and temperature sensors.

In a specific arrangement, the housing may support a shaft and bearings, with the sensor constituting a non-contact type rotary encoder in cooperation with an encoder that rotates together with the shaft.

The non-contact type rotary encoder measures physical quantities regarding rotation, such as rotation angle, rotational speed or the number of revolutions.

By conducting initial calibration of this sensor unit, the assembling errors between the sensor, circuit board, housing, bearings, shaft and encoder can be measured by correcting based on the initial calibration parameters. Also, since the housing serves both as a sensor housing and a bearing housing, the number of parts is smaller.

According to the present invention, in a sensor unit of which the sensor is of the type in which working voltage or calibration voltage is supplied through a single input end, the sensor unit further comprises a voltage stabilizing circuit for stabilizing a voltage value of a supply power source to the working voltage, and a wiring for supplying the calibration voltage to the sensor, the voltage stabilizing circuit and the wiring being provided parallel to each other between the input end of the sensor and a power source connecting end for the sensor on the circuit board, and a switching portion which can disconnect the wiring, wherein an access hole is formed in the housing through which the switching portion is accessible to disconnect the wiring. With this arrangement, after initial calibration, it is possible to disconnect the wiring by reaching the switching portion through the access hole and operating it, thereby stably supplying the working voltage to the sensor through the voltage stabilizing circuit.

DETAILED DESCRIPTION OF THE INVENTION

Now the embodiments of this invention are described with reference to FIGS. 1 and 2.

Figure 1:
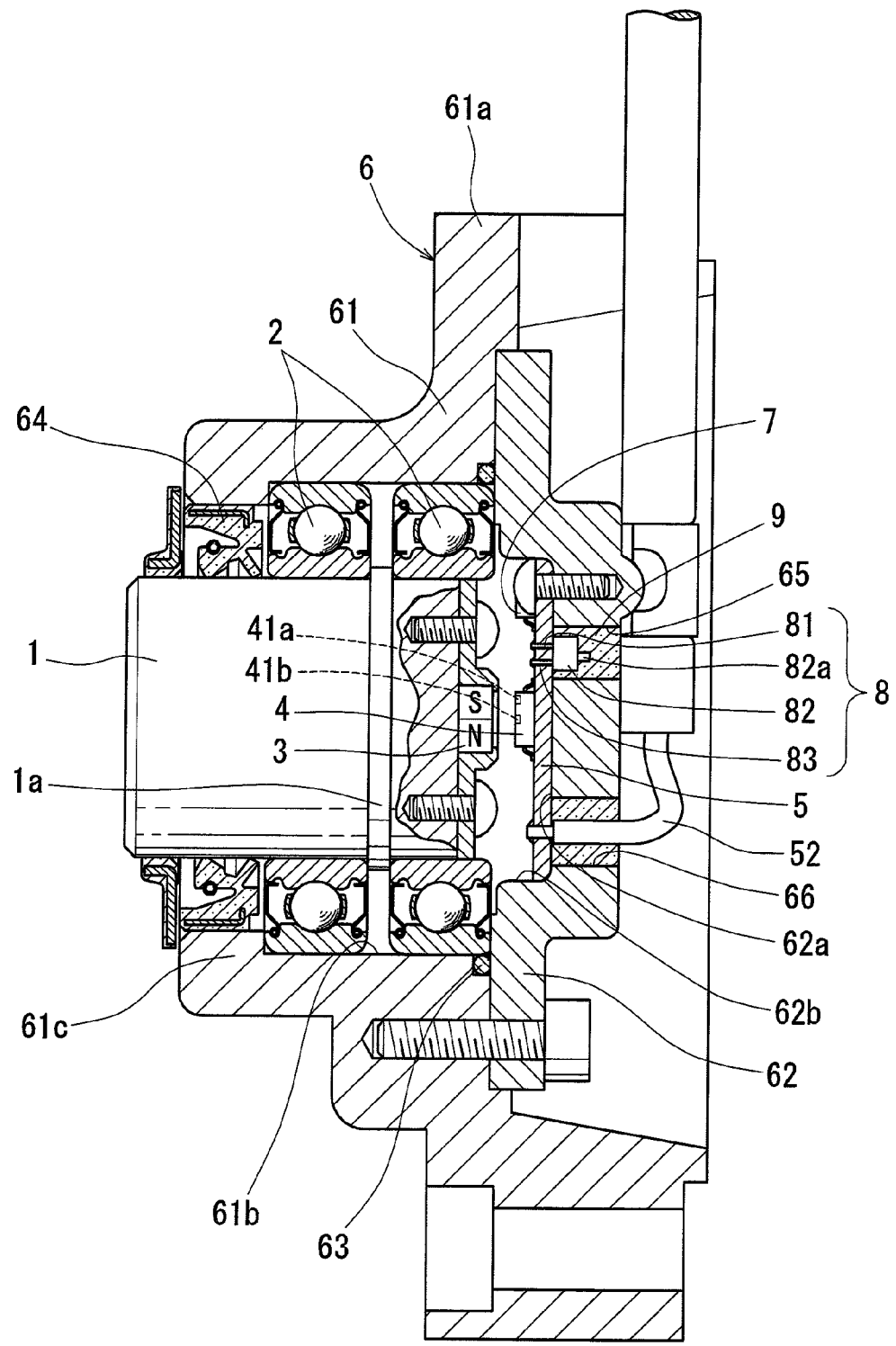
FIG. 1 is a sectional view of the entirety of a first embodiment.

FIG. 1 shows a section of the entire sensor unit according to the first embodiment of the present invention, taken along an axial plane.

As shown in FIG. 1, the sensor unit according to the first embodiment includes bearings 2 supporting a shaft 1, a sensor 4 constituting a non-contact type rotary encoder in cooperation with an encoder 3 that rotates together with the shaft 1, and a housing 6 that fixes a circuit board 5 on which the sensor 4 is mounted.

The housing 6 supports the bearings 2. The bearings 2 are a pair of ball bearings. The housing 6 includes a cylindrical body 61 having openings at both ends thereof, and having a mounting flange 61*a* on its outer periphery and a bearing seat 61*b* on its inner periphery into which the stationary races of the respective rolling bearings are fitted. The shaft 1 and the bearings 2 are inserted into the body 61 through its one open endthat is covered by a lid 62. The shaft 1 and the bearings 2 are positioned relative to the housing 6 by radially positioning the shaft 1 and the bearings 2 by means of the bearing seat 61*b* of the body 61, and then axially positioning them by means of a shoulder 61*c* of the body 61, a spacer 1*a* of the shaft 1, and the lid 62.

A seal 63 is provided between the body 61 and the lid 62 of the housing 6. With the housing 6, the shaft 1 and the bearings 2 assembled in a unit as described above, an internal space is defined between the lid 62 and the one end surface of the shaft 1 in which are received the encoder 3, which is fixed to the one end surface of the shaft 1 and the circuit board 5, which is fixed to the inner surface of the lid 62. The other end surface of the shaft 1 is exposed from the housing 6. A seal 64 is provided between the other open end of the body 61 and the shaft 1.

The sensor 4, which is mounted on one side of the circuit board 5, constitutes a magnetic encoder in cooperation with the encoder 3. This is because the presence of lubricant for the bearings 2 in the housing 6 makes it difficult to use an optical encoder.

Specifically, the sensor 4 is a well-known rotation angle sensor configured to detect the rotation angle based on a change in magnetic fluxes in two phases produced with a difference of 90°, as disclosed in the above-mentioned JP patent publication 2004-191101A.

The encoder 3 is a magnetic encoder having N and S magnetic poles arranged circumferentially alternating with each other and configured to be measured by the sensor 4. The encoder 3 is fixed to the one end surface of the shaft 1 by means of a mounting tool so that its rotation axis coincides with that of the shaft.

When the encoder 3 is fixed to the shaft 1 and the lid 62 is mounted to the body 61 with the circuit board 5 fixed to the lid 62, the sensor 4 and the encoder 3 are positioned relative to each other such that magnetic sensor elements 41a and 41b of the sensor 4 for first and second phases, respectively, face the encoder 3 with a phase difference of 90°.

Figure 2:
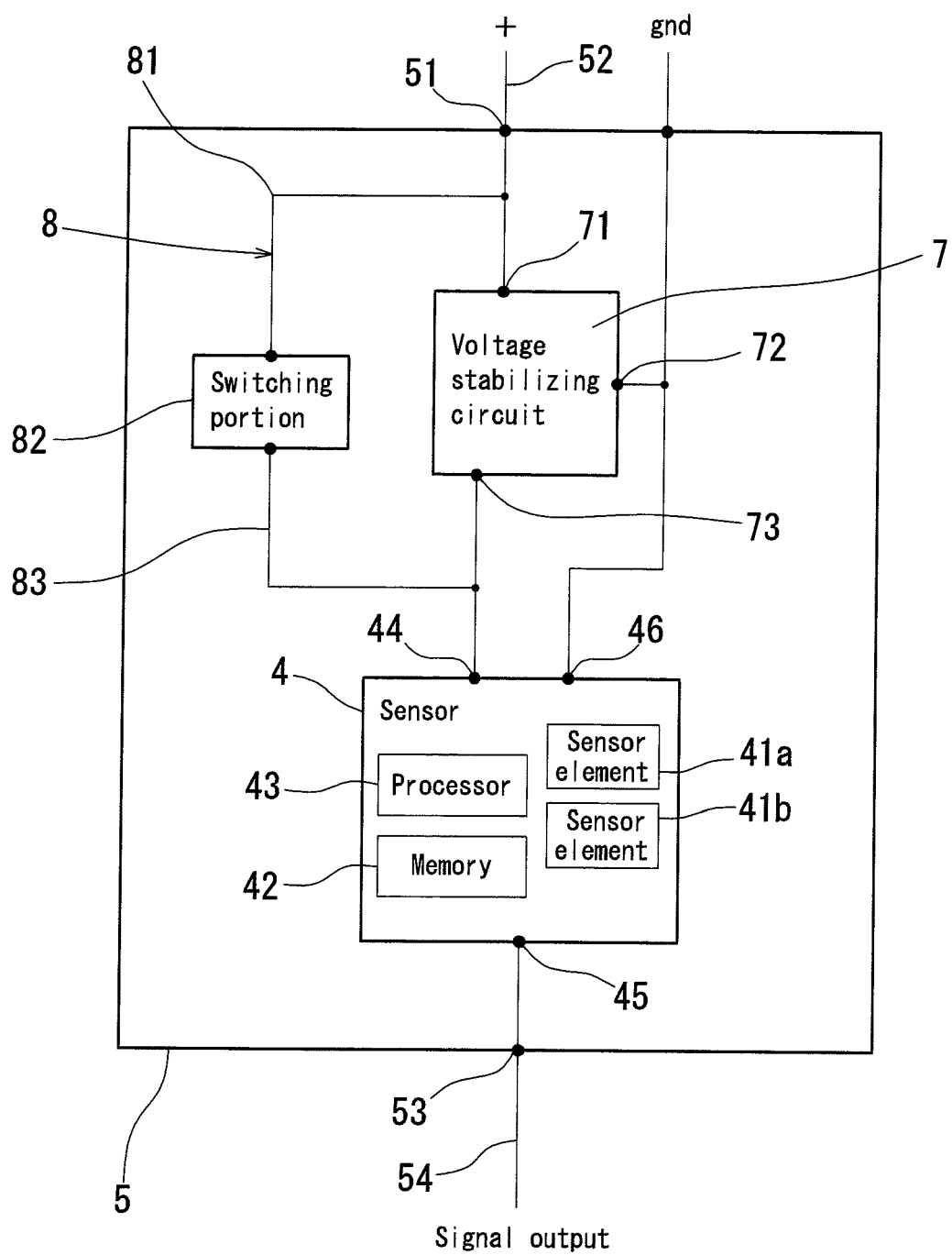
FIG. 2 is a block diagram of a circuit configuration of a sensor and a circuit board of FIG. 1.

FIG. 2 schematically shows the circuit configuration of the sensor 4 and the circuit board 5. As shown, the sensor 4 includes a non-volatile semiconductor memory 42 storing initial calibration parameters, and a processor 43 for correcting detection signals based on the initial calibration parameters stored in the non-volatile semiconductor memory 42, which are integrated together with the sensor elements 41a and 41b on the surface of the circuit board 5 facing the shaft.

The sensor 4 has an input end 44 electrically connected to a power source connecting end 51 for the sensor on the circuit board 5. An input line 52 connected to the power source connecting end 51 for the sensor is connected to a power source outside the housing 6. The output end 45 of the sensor 4 is electrically connected to the output end of the circuit board 5. The detection signals of the sensor 4 are transmitted to outside the housing 6 through an output line 54.

The sensor 4 is configured to correct the detection signals based on the initial calibration parameters with working voltage being supplied to its input end 44, and to write the initial calibration parameters with a calibration voltage that is higher than the working voltage being supplied to the input end 44. The input end 44 of the sensor 4 is an anode end, and its cathode end 46 is grounded.

Between the input end 44 of the sensor 4 and the power source connecting end 51 for the sensor, there are provided parallel to each other a voltage stabilizing circuit 7 for stabilizing the voltage of the supply power source to the working voltage, and wiring 8 through which the calibration voltage is supplied to the sensor 4.

The voltage stabilizing circuit 7 may be of any known circuit provided it can stabilize the voltage of the supply power source connected to the power source connecting end 51 for the sensor on the circuit board 5. As shown in FIG. 1, the voltage stabilizing circuit 7 is mounted on the surface of the circuit board 5 facing the shaft, separately from the sensor 4. The input end 71 of the voltage stabilizing circuit 7 is an anode end electrically connected to the power source connecting end 51 for the sensor on the circuit board 5, while the cathode end 72 of the voltage stabilizing circuit 7 is grounded. The output end 73 of the voltage stabilizing circuit 7 is electrically connected to the input end 44 of the sensor 4. But the sensor 4 and the voltage stabilizing circuit 7 may be integrated into a single circuit.

As shown in FIGS. 1 and 2, the wiring 8 comprises a first lead wire 81 having one end thereof connected between the power source connecting end 51 for the sensor on the circuit board 5 and the input end 71 of the voltage stabilizing circuit 7, a switching portion 82 or a switch having one end thereof connected to the other end of the first lead wire 81, and a second lead wire 83 having one end thereof connected to the other end of the switching portion 82. The second lead wire 83 has its other end connected between the output end 73 of the voltage stabilizing circuit 7 and the input end 44 of the sensor 4.

With this arrangement, the voltage supplied to the input end 44 of the sensor 4 from the wiring 8 or the voltage stabilizing circuit 7 is given as a potential difference between the input end 44 of the sensor 4 and the ground.

While the switch forming the switching portion 82 is on, since current is being supplied through the wiring 8 in parallel to the voltage stabilizing circuit 7, it is possible to supply the calibration voltage to the input end 44 of the sensor 4.

With the sensor unit according the first embodiment, when, as shown in FIG. 1, the shaft 1 and the bearings 2 are mounted into the body 61 of the housing 6, the lid 62 is fixed to the body 61 with the circuit board 5 fixed to the lid 62, and the housing 6 is sealed, the assembling errors of the entire sensor unit are determined. In this assembled state, as shown in FIG. 2, the input and output lines 52 and 54 extend to the outside of the housing 6, and are connected to input and output ends of an external calibration device, not shown. Thus in this state, when the shaft 1 shown in FIG. 1 is turned by 360° with the switching portion 82 on and the calibration voltage being supplied from the external calibration device to the input end 44 of the sensor 4, the detection signals of the sensor 4 are transmitted to the external calibration device. Based on the measurement results for one full revolution of the shaft, the external calibration device calculates the initial calibration parameters for correcting the measurement errors resulting from the above-mentioned assembling errors and variation in sensitivity of the sensor. The thus calculated initial calibration parameters are transmitted from the external calibration device to the sensor 4, and the sensor 4 writes the initial calibration parameters in the non-volatile semiconductor memory 42 shown in FIG. 2.

After this initial calibration, when the switch forming the switching portion 82 is turned off, the supply of current to the wiring 8 stops, so that it is possible to stably supply the working voltage only from the voltage stabilizing circuit 7 to the sensor 4.

For example, by disconnecting the external calibration device from the input and output lines 52 and 54, fixing the sensor unit shown in FIG. 1 to e.g. the housing of a construction machine through the mounting flange 61a of the housing 6, coupling the shaft 1 to the driving unit of the construction machine, and connecting the input line 52 to a generator or a battery of the construction machine, the voltage supplied to the power source connecting end 51 for the sensor on the circuit board 5 shown in FIG. 2 is supplied only to the input end 71 of the voltage stabilizing circuit 7. Thus, the voltage is stabilized to the working voltage in the voltage stabilizing circuit 7 and supplied to the input end 44 of the sensor 4. The sensor 4 makes a correction in the processor 43 based on the initial calibration parameters stored in the non-volatile semiconductor memory 42, and transmits the thus corrected detection signals from the output end 53 of the circuit board 5 to an external device through the output line 54.

If the switch is turned on and off with the lid 62 removed, the assembling error value between the body 61 and the lid 62 will change. Thus, the switching can be carried out without removing the lid 62.

Specifically, as shown in FIG. 1, an access hole 65 is formed in the lid 62 and faces the surface of the circuit board 5 facing the lid. The switching portion 82 is provided on the surface of the circuit board 5 facing the lid by passing the first lead wire 81 and the second lead wire 83 through a hole formed in the circuit board 5. The switching portion can be switched over by inserting a jig through the access hole 65.

On the inner surface of the lid 62 around the access hole 65, a board support surface 62a is provided for supporting the surface of the circuit board 5 that faces away from the shaft.

The surface of the circuit board 5 that faces away from the shaft is pressed against the board support surface 62a by screws. Needless to say, the lid 62 is made of an insulating material, and/or an insulating member is disposed between the circuit board 5 and the lid 62.

The outer periphery of the circuit board 5 is positioned by an inner peripheral wall surface 62b formed on the inner surface of the lid 62.

Since the circuit board 5 is reliably held in position by the board support surface 62a and the inner peripheral wall surface 62b, and also screwed in position, the circuit board 5 never moves relative to the lid 62 during a switching operation.

The switching portion 82 is switched over by moving an operating piece 82a parallel to the circuit board 5. Thus, the circuit board 5 is never deflected and thus never shifts in position of the sensor 4 during a switching operation, as in the case of a push button.

Thus, when disconnecting the wiring 8 by a switching operation, the sensor 4 and the circuit board 5 never move relative to the housing 6. In other words, the assembling errors never change and thus the initial calibration parameters never become invalid.

After disconnecting the wiring 8 by the switching operation, the access hole 65, which opens to the outside, can be closed by a fixing member 9. The fixing member 9 is made of an insulating and waterproof packing material, and protects the live parts of the circuit board 5.

The operating piece 82a of the switching portion 82 is kept in the off position (i.e. disconnected position) by the fixing member 9.

If higher impact resistance is required for the fixing member 9, the packing material forming the member 9 may be a silicon resin or a urethane resin. If higher mechanical strength is required for the fixing member 9, the packing material may be an epoxy resin.

Since the surface of the circuit board 5 facing the lid 62 is supported by the board support surface 62a of the lid 62 formed around the access hole 65, the space therebetween is extremely narrow. Thus, the fixing member 9 made of a packing material is held in the access hole 65 by the circuit board 5, so that the fixing member 9 can be easily fitted into the hole 65.

By forming, as in the first embodiment, the inner peripheral wall surface 62b for positioning the outer periphery of the circuit board 5, the inner peripheral wall surface 62b serves to restrict extrusion of the packing material from the outer periphery of the circuit board 5, which makes it possible to more reliably keep the packing material in the access hole 65.

The lid 62 of the housing 6 is also formed with a line hole 66 through which the input line 52 and the output line 54 extend to outside. The input line 52 and the output line 54 forms a coaxial cable. The line hole 66 is closed by a packing material in the same manner as the access hole 65. With this arrangement, it is possible to omit a connector by soldering the lines 52 and 54 to the circuit board 5.

The first embodiment is convenient in that recalibration is possible by removing the fixing member 9 from the access hole 65. In the first embodiment, as the fixing member 9, the packing material may be replaced by a cover member which is detachably mounted to the access hole 65 to keep the operating piece 82a in the off position.

The switching mechanism for the wiring 8 is not limited to the one of the first embodiment. For example, a connector as the switching portion may be provided at an intermediate portion of the wiring and in the access so that the wiring can be selectively connected and disconnected by inserting and pulling the connector into and out of the access hole. Alternatively, the circuit board may be connected to one end of the wiring through the connector. But in this arrangement, since a pulling force is applied to the circuit board, the connector is preferably provided at an intermediate portion of the wiring.

The second embodiment of the present invention is described with reference to FIGS. 3(*a*) and 3(*b*). The following description is made mainly of what differs from the first embodiment and the description of structures that are identical or similar to those of the first embodiment is omitted.

Figure 3A:
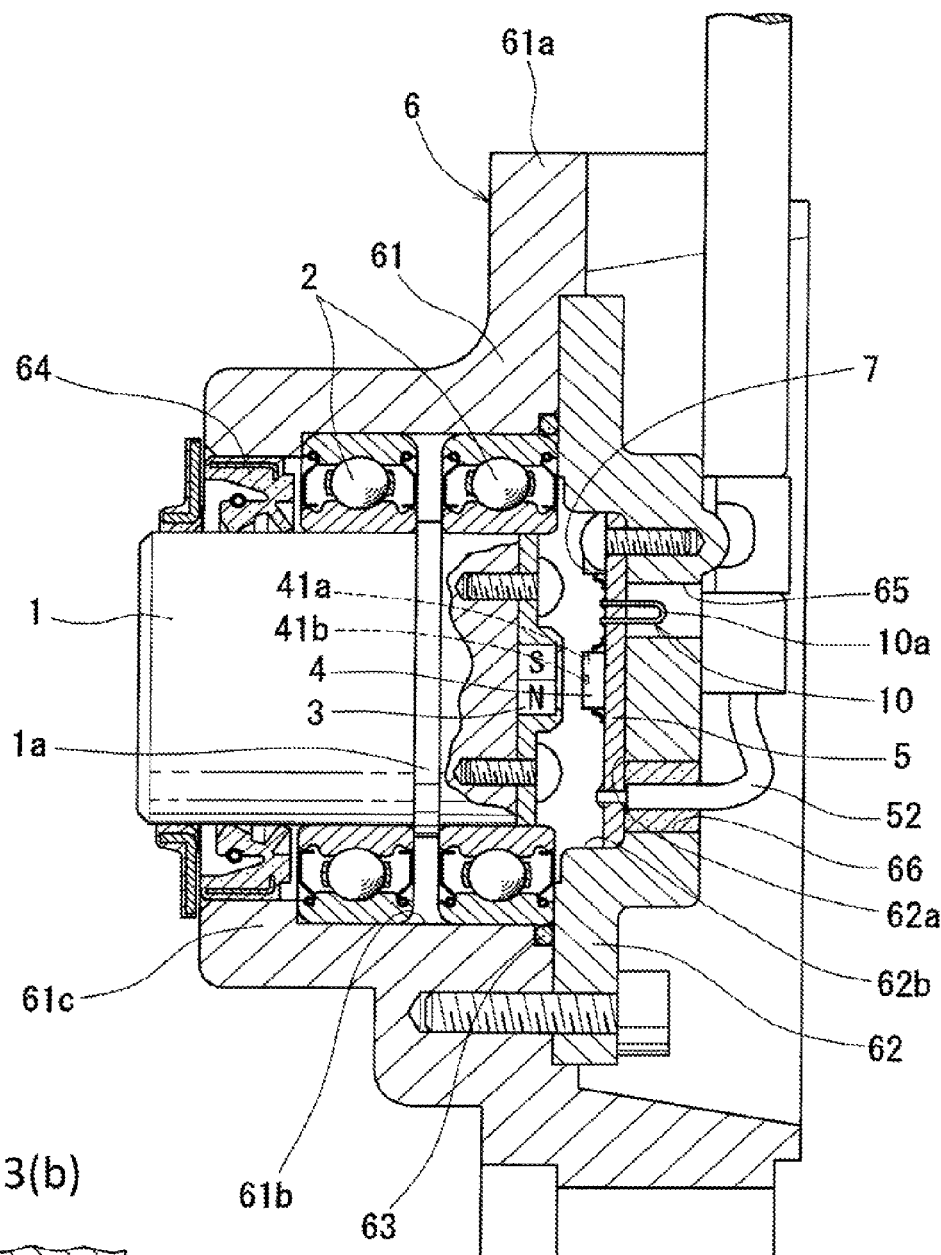
FIG. 3(*a*) is a sectional view of the entirety of a second embodiment, and FIG. 3(*b*) is a partial sectional view in the vicinity of an access hole after cutting of wiring.
Figure 3B:
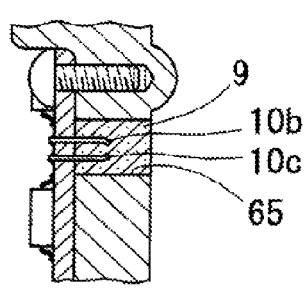

As shown in FIG. 3(*a*), the sensor unit according to the second embodiment includes wiring 10 comprising a single lead wire for supplying the calibration voltage to the sensor 4. The wiring 10 includes a redundant portion 10a extending through holes formed in the circuit board 5 into the access hole 65. The redundant portion 10a is bent toward the outside so that this portion can be easily cut by a nipper from outside the lid 62. Thus, the redundant portion 10a of the wiring serves as the switching portion which can disconnect the wiring 10. Since the redundant portion 10a is simply cut by a nipper after initial calibration, the sensor 4 and the circuit board 5 never move relative to the housing 6.

After cutting the redundant portion 10a of the wiring 10, as shown in FIG. 3(*b*), the cut ends 10b and 10c are kept apart from each other by the fixing member so as to keep the wiring disconnected. In the second embodiment, as the fixing member 9, the packing material may be replaced by a cover member detachably mounted to the access hole 65 and including a wall portion insulating and separating the cut ends 10b and 10c from each other.

In the second embodiment, the wiring and the switching portion can be formed by the single lead wire without the need to provide a switch or a connector as the switching portion.

Now description is made of an arrangement in which the sensor unit according to this invention is used in a rotation angle detecting device, and further a protective means for a resin sealing portion in which the sensor is sealed.

The protective means for such a resin sealing portion relates to a rotation angle detecting device including a shaft rotatably supported by a housing, and a rotation angle sensor for detecting the rotation angle of the shaft, and has been developed for the following reasons.

This type of rotation angle detecting device includes bearings mounted between the inner periphery of the housing and the shaft. A housing lid can be detachably fitted to one end of the housing to cover a bearing mounting opening of the housing at the one end thereof. With the housing lid fitted, an inner space is defined by the housing and the housing lid. In this inner space, the rotation angle sensor is mounted. Thus, it is possible to protect the rotation angle sensor from external force by means of the housing and the housing lid.

With this type of rotation angle detecting device, it is possible to mount a circuit board on the housing lid or provide wiring on the housing lid beforehand. Also, it is possible to install the circuit board using the side surface area of the housing lid. Another advantage is that by fitting the housing lid with the shaft supported by the bearings, it is possible to determine the positional relationship between the rotation angle sensor and the shaft.

As rotation angle sensors which can be mounted in the above manner, contact type angle potentiometers are widely used (JP patent publication 11-344302A).

Such an angle potentiometer has a brush mounted to one end surface of the shaft. The potentiometer also includes annular resistor and electrical contact piece fixed to a base and brought into contact with the brush. The base is adhesively mounted to the other side of the housing lid at its portion facing the one end surface of the shaft. When the housing lid is fitted in position with the shaft supported by the bearings, the brush, the resistor and the electrical contact piece contact each other, thus forming a detection circuit for converting the rotation angle to electrical signals.

A recess is formed in the one side of the lid in which the circuit board is received. With the circuit board received in the recess, the circuit board can be sealed in resin. The circuit board is structured as an AD converter for digitizing the analogue detection signals from the angle potentiometer. A power supply circuit is mounted on the circuit board.

The other end of the shaft protrudes to outside from a shaft hole formed in the other side of the housing, so that the protruding end of the shaft can be coupled to another device.

The detection signals that have been digitized by the circuit board are transmitted to an external computer and processed therein.

With the rotation angle detecting device disclosed in JP patent publication 11-344302A, since the contact type detection circuit and the circuit board are mounted separately on the respective sides of the housing lid, it is possible to prevent water and oil from reaching the live parts of the circuit with the resin sealing. Also, it is possible to reliably prevent resin from adhering to the resistor and/or the electrical contact piece during resin sealing, thereby reliably preventing detection errors.

With the rotation angle detecting device disclosed in JP patent publication 11-344302A, since the resin sealing portion is exposed to outside, if e.g. the rotation angle detecting device is used to detect the rotation angle of the shaft of a construction machine, the resin may be damaged under external force such as vibrations and impacts. Especially if the resin is a semi-solidifiable resin such as a urethane resin, although such a resin can reduce vibrations of the elements mounted on the circuit board due to its flexibility, the resin seal is more likely to be broken than a solidifiable resin because the resin itself is susceptible to external force.

If, instead of resin, the circuit board is covered by a cover member, or if the resin sealing portion is covered by a cover member, such a separate cover member adds to the number of parts. Also, it may be difficult to provide an installation space for the cover member.

With the rotation angle detecting device disclosed in JP patent publication 11-344302A, the contact points of the resistor and the electrical contact piece can be connected to the circuit board only after the base is mounted to the other side of the housing lid with the resistor and the electrical contact piece fixed to the base. Thus, it is necessary to separately carry out resin sealing of the circuit board with the housing lid turned upside down with the base mounted thereto. If the circuit board and the base are mounted on the same side of the housing lid, detection errors may occur due to resin sealing.

In view of this, it is desired to protect the resin sealing portion without providing a cover member, while reducing the time and labor for resin sealing of the circuit board mounted in a rotation angle detecting device.

In order to achieve this object, a protecting means is provided for the resin sealing portion in which in a rotation angle detecting device including a shaft rotatably supported by a housing, and a rotation angle sensor for detecting the rotation angle of the shaft, wherein a housing lid can be mounted to the one end of the housing so as to cover the bearing mounting opening, a recess is formed in the side of the housing lid, a circuit board for processing the detection signals of the rotation angle sensor is received in the recess, and the circuit board is sealed in resin, the rotation angle sensor consists only of a magnetic encoder, and an outer peripheral portion is formed on the other side of the housing lid which is adapted to be brought into abutment with the other end of the housing such that the recess is located radially inwardly of the outer peripheral portion.

The rotation angle sensor, which consists of the magnetic encoder, is an ordinary sensor having a plurality of magnetic sensor elements which produce analogue detection signals according to change in magnetic flux due to the rotation of the encoder which rotates together with the shaft, wherein the magnetic sensor elements are provided in pairs and arranged such that analogue detection signals are obtained having a phase difference between each pair of the sensor elements, and the rotation angle is calculated by the processing circuit based on the analogue detection signals having a phase difference. The processing circuit is mounted on the circuit board.

Specifically, by forming the outer peripheral portion on the other side of the housing lid that abuts the one end of the housing such that the recess is located radially inwardly of the outer peripheral portion, when the housing lid is mounted to the one end of the housing, the resin sealing portion is located in the inner space defined by the housing and the housing lid, and thus is protected from outside by the housing and the housing lid.

The plurality of magnetic sensor elements of the rotation angle sensor are provided on the other side of the housing lid at its portion, like the recess, radially inwardly of the outer peripheral portion so as to face the magnetized surface of the encoder, which rotates together with the shaft. That is, since the plurality of magnetic sensor elements and the circuit board are provided on the same side of the housing lid, it is not necessary to turn the housing lid upside down when sealing the circuit board, which is received in the recess, in resin. Thus, the resin sealing of the circuit board is less troublesome.

Even if resin is adhered to the magneto-sensitive surfaces of the magnetic sensor elements, since magnetic flux passes through resin, there will be no influence on detection accuracy. Thus, if the rotation angle sensor consists only of the magnetic encoder, no detection error occurs due to resin sealing.

The rotation angle sensor preferably includes a sensor integrated circuit in which are packaged a plurality of magnetic sensor elements and an analogue processing circuit. By mounting the sensor integrated circuit on the circuit board, the magnetic sensor elements and the circuit board can be mounted and sealed in resin at one time.

Also, this type of sensor integrated circuit is not a relatively large-scale circuit like an AD converter, but is compactly integrated together with the plurality of the magnetic sensor elements because processing is carried out by the analogue processing circuit. Thus, only a small installation space is needed on the circuit board, which in turn makes it possible to reduce the size of the recess. Another advantage is that this type of sensor integrated circuit is commercial easily available in various types.

It is also possible to use a rotation angle sensor in which instead of the sensor integrated circuit, the plurality of magnetic sensor elements and the analogue processing circuit are separately mounted.

A rolling bearing may be mounted between the housing and the shaft, and a preload may be applied to the bearing by pressing the outer peripheral portion of the lid against one side of the outer race of the rolling bearing. With this arrangement, the preload serves to increase the rigidity of the bearing, thus preventing run-out of the shaft, which in turn prevents displacement of the magnetic sensor element and the encoder relative to each other.

In this arrangement, if the space between the one end surface of the shaft and the housing lid is too narrow to install the rotation angle sensor therein because the other side of the housing lid is a radial flat surface, a spacer ring is disposed between the outer race and the housing lid.

As described above, the recess is located radially inwardly of the outer peripheral portion, which presses the one side of the outer race.

Thus, if the recess is made concave in one axial direction from the outer peripheral portion such that its bottom axially faces the one end surface of the shaft, it is possible to increase the space for installing the rotation angle sensor using the shape of the recess, thus making it possible to omit or reduce the width of a spacer ring.

With the arrangement in which the resin is provided such that its surface is at a level lower than the magneto-sensitive surfaces of the magnetic sensor elements, since there is no resin between the magneto-sensitive surfaces and the magnetized surface of the encoder, it is possible to reduce the magnetic gap therebetween, which in turn makes it possible to use smaller magnetic sensor elements and encoder.

As described above, the resin-sealed circuit board is located in the inner space defined by the housing and the housing lid. Thus, double protection is provided for the circuit board from external water and oil. Even if the resin is a semi-solidifiable resin, since the resin sealing portion is protected by the housing and the housing lid, it is less likely to be damaged.

The semi-solidifiable resin may be, besides urethane resin, e.g. a foamed urethane resin or a silicon resin.

As described above, with the protective means for the resin sealing portion, the rotation angle sensor consists only of the magnetic encoder, the processing circuit of the rotation angle sensor is mounted on the circuit board, the outer peripheral portion to be pressed against the one end of the housing is formed on the other side of the housing lid, and the recess is located radially inwardly of the outer peripheral portion. With this arrangement, it is possible to protect the resin sealing portion without providing a cover member, while saving the labor of resin sealing of the circuit board mounted in the rotation angle detecting device.

Figure 4:
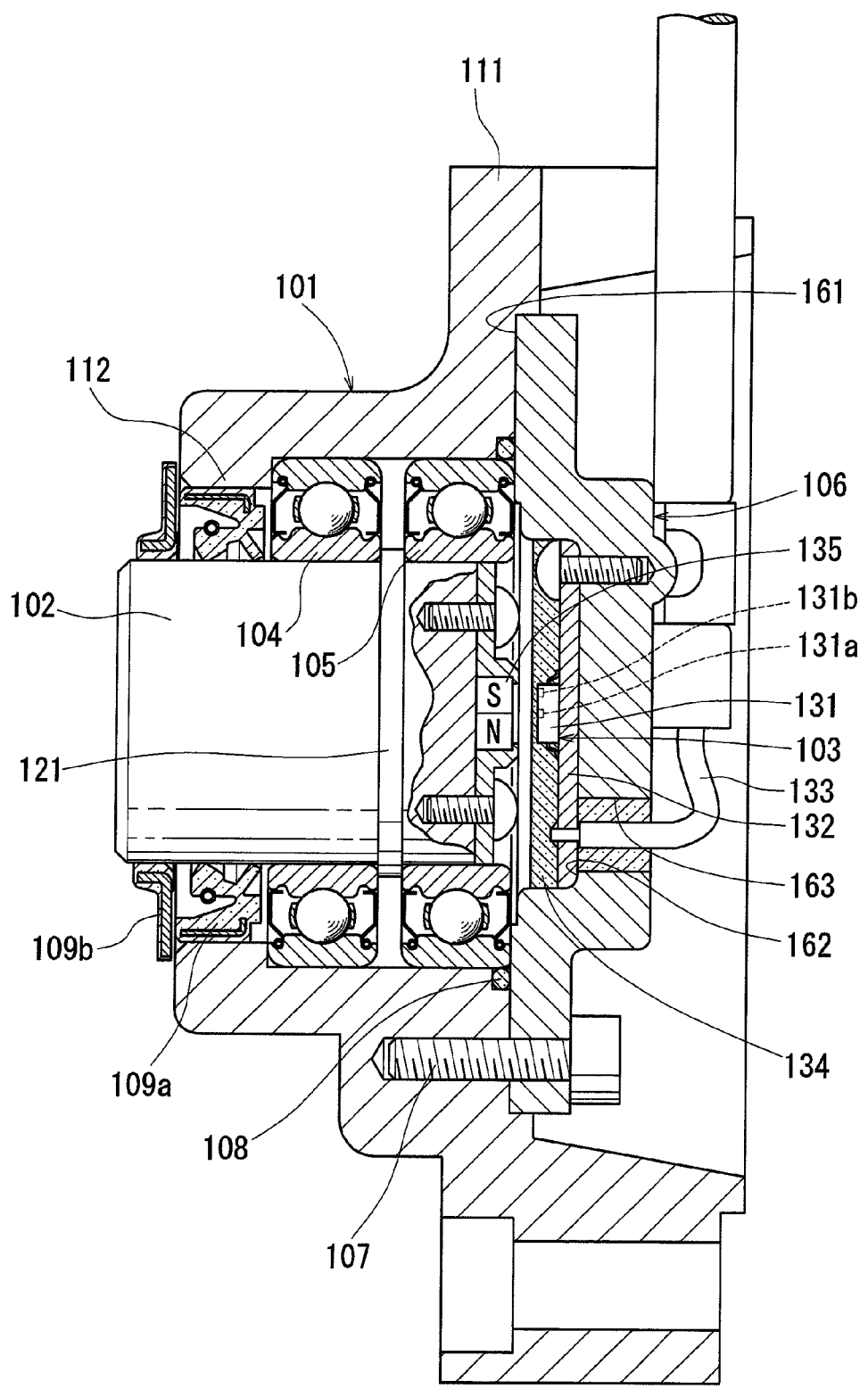
FIG. 4 is a sectional view of the entirety of a rotation angle detecting device according to an embodiment of a protective means for a resin sealing portion.

Now referring to FIG. 4, description is made of a rotation angle detecting device embodying the protective means for the resin sealing portion.

FIG. 4 shows a section of the entire rotation angle detecting device of the embodiment, taken along axial plane.

As shown in FIG. 4, the rotation angle detecting device of the embodiment includes a shaft 102 rotatably supported relative to a housing 101, a rotation angle sensor 103 for detecting the rotation angle of the shaft 102, and a duplex bearing comprising rolling bearings 104 and 105 mounted between the housing 101 and the shaft 102. A housing lid 106 can be mounted to the one end of the housing 101 so as to cover a bearing mounting opening at the one end of the housing 101.

The housing 101 has a mounting flange 111 on its outer periphery so that the housing 101 can be screwed to a housing of another device with the rotation angle detecting device assembled. The other end surface of the shaft 102 protrudes from shaft hole formed in the other side of the housing 101 and can be connected to a shaft of an external device.

The rotation angle sensor 103 consists only of a magnetic encoder.

The rolling bearings 104 and 105 have seals for preventing lubricant from being scattered in the rotation angle sensor housing. In view of the rotational inertia resistance, the rolling bearings 104 and 105 are ball bearings.

On the other side of the housing lid 106, an outer peripheral portion 161 is formed that abuts the one end of the housing 101, and also a recess 162 is formed which is recessed from the outer peripheral portion 161 in one axial direction and located radially inwardly of the outer peripheral portion 161.

With the shaft 102 rotatably supported by the bearings 104 and 105 relative to the housing 101, the outer peripheral portion 161 of the housing lid 106 abuts the one end of the housing 101, and also abuts the one side of the outer race of the rolling bearing 105, which is located nearer to the housing lid 106. The housing lid 106 is fixed in position by fixing its outer peripheral portion 161 to the housing 101 with bolts 107. In this fixed state, the recess 162 of the housing lid 106 is recessed such that its bottom axially faces the one end surface of the shaft 102. With this arrangement, the axial distance between the housing lid 106 and the one end surface of the shaft 102 is increased by the recess 162, so that the inner space for installing the rotation angle sensor 103 can be defined without using a spacer ring.

By pressing the outer peripheral portion 161 of the housing lid 106 against the one end of the housing 101 with the bolts 7, the outer peripheral portion 161 of the housing lid 106 is pressed against the one side of the outer race of the rolling bearing 105 over its entire circumference. As a result, fixed position preload is applied to the bearings 104 and 105 by a shoulder 112 of the housing 101, a spacer portion 121 of the shaft 102, and the housing lid 106. This increases the rigidity of the bearings 104 and 105, thereby preventing run-out of the shaft 102.

A packing 108 provides a seal between the outer peripheral portion 161 of the lid 106 and the housing 101. An oil seal 109a and a slinger 109b provide a seal between the shaft hole of the housing 101 and the shaft 102.

The rotation angle sensor 103 has a sensor integrated circuit 131 in which are packaged a plurality of magnetic sensor elements 131a and 131b, and a processing circuit comprising an analogue processing circuit. The sensor integrated circuit 131 may be one having an analogue processing circuit for calculating the rotation angle based on sine curve outputs and cosine curve outputs, such as one disclosed in JP patent publication 2004-191101A.

The sensor integrated circuit 131 is mounted on the circuit board 132. One end of an input-output line 133 is connected to the circuit board 132. The other end of the input-output line 133 is connected to an external device.

The sensor integrated circuit 131 and the circuit board 132, to which one end of the input-output line 133 is fixed, are received in the recess 162 formed in the other side of the housing lid 106. The circuit board 132 is screwed to the bottom of the recess 162 so that its surface extends along a radial plane, thereby orienting the magneto-sensitive surfaces of the magnetic sensor elements 131a and 131b in the axial direction. The magneto-sensitive surfaces of the magnetic sensor elements 131a and 131b are flash with a molded flat surface formed on the other axial end of the sensor integrated circuit 131. If the housing lid 106 has electrical conductivity, the surface of the circuit board 132 has to be insulated from the bottom of the recess 162.

Screwing of the circuit board 132 can be carried out with the other side of the housing lid 106 facing upward. With the housing lid 106 kept in this position, resin 134 is poured into the recess 162 to seal the circuit board 132. The resin 134 used is a urethane resin. The sensor integrated circuit 131 is completely buried in the resin 134, so that the vibration damping effect of the sensor integrated circuit 131 due to flexibility of the resin 134 prevents damage to its portion soldered to the circuit board 132.

The housing lid 106 is formed with a through hole 163 which opens to the surface of the circuit board 132 with the circuit board 132 screwed to the recess 162. The circuit board 132 is screwed in position with the input-output line 133 protruding from the through-hole 163 to outside.

The encoder 135 of the rotary angle sensor 103 is a magnetic drum having N and S magnetic poles arranged circumferentially alternating with each other and supported by the shaft 102 by being fixed to the one end surface of the shaft 102 by means of a mounting tool such that its rotation axis coincides with that of the shaft. For simplicity of the shape, the one end surface of the shaft 102 is a flat radial surface, and the encoder 135 is supported by the one end surface of the shaft 102 by a mounting tool.

When the encoder 135 is fixed to the shaft 102 and the housing lid 106 is axially pressed against the one end of the housing 101 by the bolts 107 with the circuit board 132 fixed to the housing lid 106, the magneto-sensitive surfaces of the magnetic sensor elements 131a and 131b are fixed in position so as to axially face the magnetized surface of the encoder 135 with a phase difference of 90° relative to each other.

With the rotation angle detecting device according to this embodiment, it is possible to directly seal the circuit board 132 with resin after screwing the circuit board 132 in position in the recess 162 of the housing lid 106 with the sensor integrated circuit 131 mounted on the circuit board 132 beforehand. Thus, with the rotation angle detecting device according to this embodiment, it is not necessary to turn the housing lid 106 upside down, so that resin sealing of the circuit board 132 is less troublesome.

The through hole 163 is closed with a packing material after the housing lid 106 is mounted to the housing 101 and the initial calibration of the rotation angle sensor 103 is complete. This is because if the through hole is closed before the initial calibration, and if initial errors are found in the rotation angle sensor 103, the packing material has to be wasted. Thus, it is not necessary to turn the housing lid 106 upside down even though the through hole 163 is formed.

With the rotation angle detecting device according to this embodiment, with the housing lid 106 mounted to the one end of the housing 101, since the resin sealing portion formed in the recess 162 is located in the inner space defined by the housing 101 and the housing lid 106, it is possible to protect the resin sealing portion from outside with the housing 101 and the housing lid 106.

Figure 5:
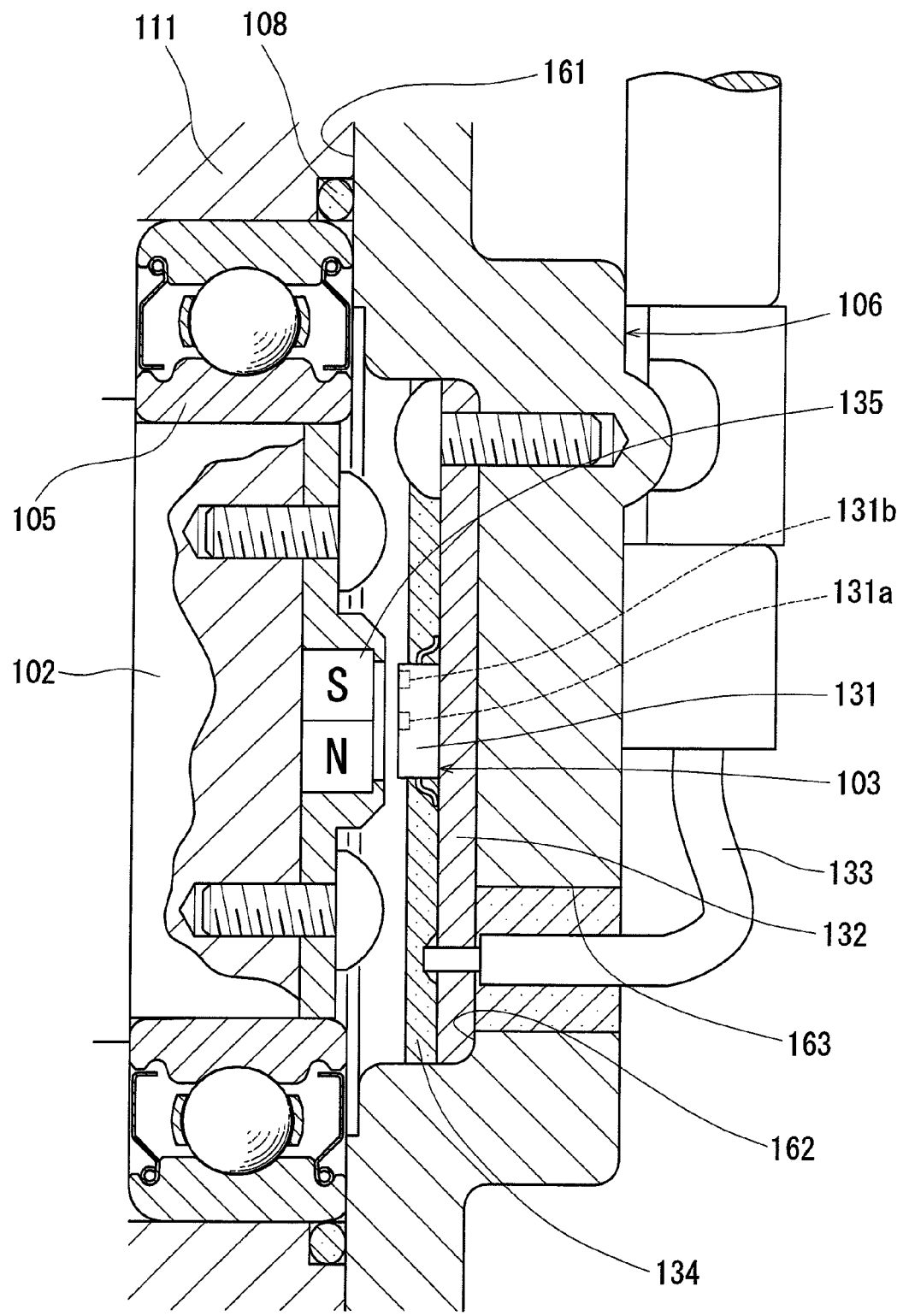
FIG. 5 is a sectional view of a different resin sealing arrangement in the rotation angle sensor of FIG. 4.

With the rotation angle detecting device according to this embodiment, in order to preferentially protect the sensor integrated circuit 131, the sensor integrated circuit 131 is buried in the resin 134. But as shown in FIG. 5, which shows a different resin sealing arrangement, the resin 134 may be provided such that its surface is at a level lower than the magneto-sensitive surfaces of the magnetic sensor elements 131a and 131b. With this arrangement, since there is no resin between the magneto-sensitive surfaces and the magnetized surface of the encoder 135, it is possible to reduce the magnetic gap therebetween, which in turn makes it possible to use smaller magnetic sensor elements and encoder. But in this case too, the resin 134 has to be arranged such that all the live parts of the circuit board 132 are buried in the resin 134.

FIGS. 4 and 5 show only the relevant portion of this technical means. In order to provide the embodiment of FIG. 4 or 5 with the structures of the embodiment shown in FIGS. 1 to 3, it is only necessary to add the voltage stabilizing circuit and the switching portion to the circuit board 132 as shown e.g. in FIG. 1, and form the access hole in the housing lid 106 of FIGS. 4 and 5, as shown e.g. in FIG. 1.

The rotation angle detecting device according to this technical means is not limited to those shown in FIGS. 4 and 5, and can be modified provided such a rotation angle detecting device is considered to include the above-mentioned technical means and can achieve the above-mentioned object. The rotation angle detecting device according to this technical means may not be used together with the sensor unit according to this invention.

What is claimed is:

1. A sensor unit comprising a sensor for correcting detection signals using initial calibration parameters with a working voltage supplied thereto, and a housing fixing in position a circuit board on which the sensor is mounted, said sensor being configured to write the initial calibration parameters with a calibration voltage that is higher than the working voltage supplied to an input end of the sensor,
wherein the sensor unit further comprises a voltage stabilizing circuit for stabilizing a voltage value of a supply power source to said working voltage, and wiring for supplying said calibration voltage to the sensor, said voltage stabilizing circuit and said wiring being provided parallel to each other between the input end of the sensor and a power source connecting end for the sensor on the circuit board, and a switching portion which can disconnect the wiring, wherein an access hole is formed in the housing through which the switching portion is accessible to disconnect the wiring.

2. The sensor unit of claim 1 wherein said wiring comprises a lead wire and wherein said switching portion comprises a redundant portion of said wiring.

3. The sensor unit of claim 1 wherein said switching portion comprises a switch for opening and closing the wiring.

4. The sensor unit of claim 2 further comprising a fixing member configured to close the access hole, thereby keeping the switching portion in a disconnected position.

5. The sensor unit of claim 4 wherein said fixing member is an insulating and waterproof packing material.

6. The sensor unit of claim 5 wherein said packing material is made of at least one of silicon resin, urethane resin and epoxy resin.

7. The sensor unit of claim 5 wherein the sensor is mounted on one side of the circuit board, wherein the access hole faces the other side of the circuit board, wherein the switching portion is located in the access hole, and wherein the housing has a board support surface supporting the other side of the circuit board around the access hole.

8. The sensor unit of claim 1 wherein the housing supports a shaft and bearings, and wherein said sensor constitutes a non-contact type rotary encoder in cooperation with an encoder that rotates together with the shaft.

9. The sensor unit of claim 3 further comprising a fixing member configured to close the access hole, thereby keeping the switching portion in a disconnected position.

10. The sensor unit of claim 6 wherein the sensor is mounted on one side of the circuit board, wherein the access hole faces the other side of the circuit board, wherein the switching portion is located in the access hole, and wherein the housing has a board support surface supporting the other side of the circuit board around the access hole.

11. The sensor unit of claim 2 wherein the housing supports a shaft and bearings, and wherein said sensor constitutes a non-contact type rotary encoder in cooperation with an encoder that rotates together with the shaft.

12. The sensor unit of claim 3 wherein the housing supports a shaft and bearings, and wherein said sensor constitutes a non-contact type rotary encoder in cooperation with an encoder that rotates together with the shaft.

13. The sensor unit of claim 4 wherein the housing supports a shaft and bearings, and wherein said sensor constitutes a non-contact type rotary encoder in cooperation with an encoder that rotates together with the shaft.

14. The sensor unit of claim 5 wherein the housing supports a shaft and bearings, and wherein said sensor constitutes a non-contact type rotary encoder in cooperation with an encoder that rotates together with the shaft.

15. The sensor unit of claim 6 wherein the housing supports a shaft and bearings, and wherein said sensor constitutes a non-contact type rotary encoder in cooperation with an encoder that rotates together with the shaft.

16. The sensor unit of claim 7 wherein the housing supports a shaft and bearings, and wherein said sensor constitutes non-contact type rotary encoder in cooperation with an encoder that rotates together with the shaft.

* * * * *